Sept. 19, 1939.  F. E. PAYNE  2,173,744
PLASTIC PACKING WITH REINFORCED BACK
Filed April 18, 1938
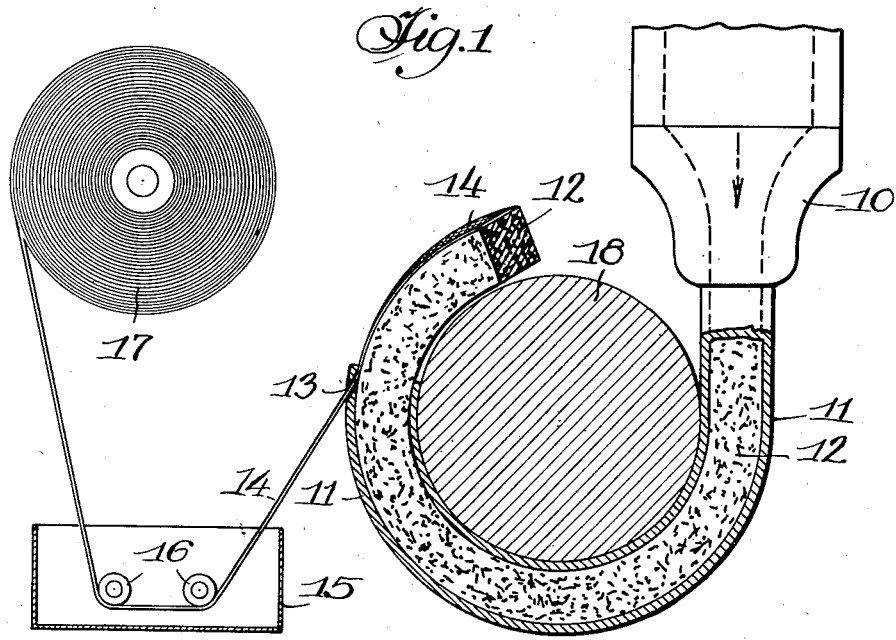
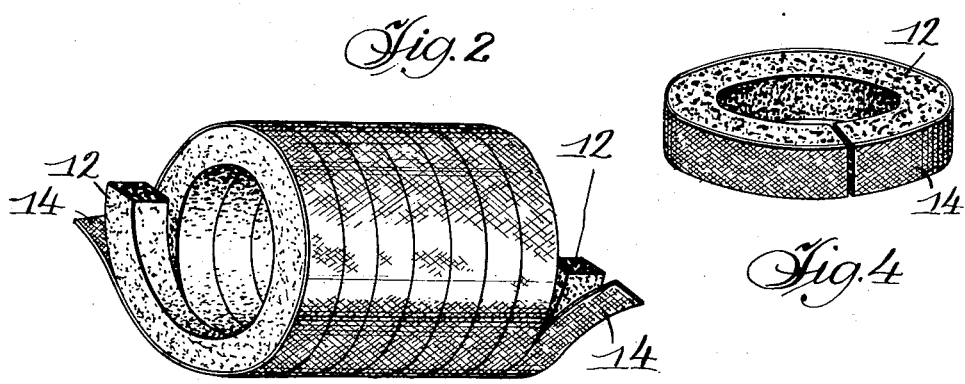
Inventor,
Frank E. Payne,
Witness: Chritton, Wiles, Davies, Hirsch & Dawson, Attys.

Patented Sept. 19, 1939

2,173,744

UNITED STATES PATENT OFFICE 2,173,744

PLASTIC PACKING WITH REINFORCED BACK

Frank E. Payne, Glencoe, Ill., assignor to Crane Packing Company, Chicago, Ill., a corporation of Illinois Application April 18, 1938, Serial No. 202,751

1 Claim. (Cl. 288—17)

My invention relates to improvements in packing of the type in which a readily deformable or plastic core is used. Such cores may contain fibrous material such as asbestos, flax, cotton, and graphite, rubber, originally in unvulcanized form, or some other suitable binder, with or without small particles of non-abrasive metal. After the preliminary extruding operation, the material is vulcanized and bent to any one of a number of different forms. Such packings are limited with respect to the extent they may be bent to helical or circular form as the outer material of the core cracks open readily, particularly when the length of packing is bent to a rather small radius. It has been necessary heretofore to braid a jacket entirely around elastic packing of this character, thus adding to the manufacturing cost.

The general object of my invention is to overcome this difficulty by providing what is essentially a plastic packing having on the outer face only, a reinforcement which permits bending, and makes possible the formation of rings of small diameter.

Another object is to provide a packing of deformable or compressible material of this character with a reinforcing tape or tension member vulcanized thereto or otherwise united therewith to form a substantially integral part thereof.

In the accompanying drawing I have illustrated a commercial embodiment of my invention, although it is understood that it may be embodied in various other forms.

Fig. 1 is a schematic illustration of the method of manufacture;

Fig. 2 is a perspective view of a length of finished packing in the form of a helix;

Fig. 3 shows a length of packing rolled in spiral form; and

Fig. 4 is a perspective view of a packing ring or a short length of packing cut off from one of the longer lengths illustrated and bent around in the form of a split ring.

In Fig. 1, I have shown the outlet 10 of a suitable press or extruding machine from which the packing material is extruded in the form of a core, which comprises preferably fibrous material, graphite and a rubber binder, with or without small particles of non-abrasive metal. The asbestos is preferably long fiber asbestos and the binder may be a so-called Duprene binder in unvulcanized form. The outlet of the press has a tubular extension 11, which is preferably rectangular in cross section and is curved through a half circle, about as shown. Thus the core 12 is extruded in a curved length of the desired cross section and requires no rolling operation later to shape it. However, if a round section is extruded, the same may later be pressed or rolled to rectangular cross section. The extension 12 has an opening or slot 13 therein as shown in Fig. 1, through which the reinforcing member may be fed against the outer surface of the length of packing.

Said reinforcing member or tension member may be in the form of a strip of tape 14, i. e., fabric preferably cut on the bias, as shown in Fig. 2, or other suitable material capable of resisting tension and of such character as not to interfere with the frictional properties of the packing as a whole. Said tape may be passed through a container 15, under rollers 16 in order to apply thereto rubber in solution, resins, gums, waxes, drying oils, or cement or other suitable adhesive. The addition of rubber makes it possible to vulcanize the strip to the outer surface of the packing. The strip itself is fed from a suitable reel 17. As the packing with the reinforcement on the back leaves the end of the tube 11, it may be readily wound in helical form on a mandrel 18 from which it may be later withdrawn.

The vulcanizing may take place after the reinforcing strip is positioned on one side of the packing, or the core may be vulcanized first and the tension member secured thereto subsequently by means of an adhesive such as mentioned. The reinforced surface and the wearing face may be further lubricated with graphite and a suitable binder such as will provide a dry lubricated face.

Packings of this character are capable of withstanding high temperatures, particularly where no metal is employed in the core. Also, they maintain an effective seal on reciprocating rods and plungers, for example, operating against pressures of several thousand pounds per square inch. Even though the fabric reinforcement should deteriorate in time, the effectiveness of the seal is not diminished after the packing has once been installed and the stuffing box tightened.

Packing such as described has great resilience at all times, dry lubrication is presented at the wearing face, the packing does not harden under the highest steam temperatures, nor does it harden while in stock and it has other commercial advantages. The reinforcing strip may be made of cotton or asbestos, or of anti-friction metal. Cotton has the advantage of being cheap and it is immaterial if it is burned away, as previously stated. Where graphite is applied to the tape it makes it substantially the same color as the rest of the packing.

It has been proposed heretofore to reinforce long lengths of packing with cord or lengths of fibrous material imbedded longitudinally in the packing material, a considerable number of such strands being used. However, when the packing is bent, the only strands which are effective to resist tension are those near the outside or those in the outer half of the ring, the packing material in the inner half section of the ring being under compression.

It has been proposed also to manufacture packing which consists largely of rubber or rubberized fabric, i. e., a rubber channel member molded in circular form. In such cases the flanges of the channel member extend radially inwardly and the anti-friction packing material is positioned in said channel member and reinforced by the said flanges of the channel as well as by the bottom of said channel Such packing may be formed also in straight lengths and then bent to helical or ring form and cut into shorter lengths suitable for use, in which case the base of the rubber channel being on the outside stretches, but without breaking open.

The packing of my invention is of a different type and substantially the entire cross section of the material of the packing is useful in reducing friction, there being no channel members at the side or any auxiliary reinforcement other than the tape which occupies an insignificant portion of the cross sectional area. Also, as contrasted with the packing having reinforcing fibers embodied therein, my packing has the advantage that the reinforcing member is located where it is needed the most, as contrasted with imbedded strands, the majority of which perform no function.

I claim:

A packing comprising an elongated curved body containing long fibers of heat resistant material with graphite and a binder of vulcanized rubber-like material incorporated therein, and a strip of fabric secured throughout its length to the peripheral surface only of said elongated body to serve as a tension member and prevent rupture of said elongated body when the same is bent to a small diameter, said body being compressible, and presenting a dry lubricated, friction-reducing wearing face for contact with a moving part.

FRANK E. PAYNE.